United States Patent Office 3,424,676
Patented Jan. 28, 1969

3,424,676
PROCESS FOR REMOVING ORGANIC CONTAMINANTS USING COAL ADSORBENTS
Glenn E. Johnson, Pittsburgh, Albert J. Forney, Coraopolis, and Joseph H. Field, Pittsburgh, Pa., assignors to the United States of America as represented by the Secretary of the Interior
No Drawing. Filed Aug. 25, 1965, Ser. No. 482,640
U.S. Cl. 210—40
Int. Cl. B01d 15/00; C02b 1/14
5 Claims

ABSTRACT OF THE DISCLOSURE

Effluent from a sewage treatment plant is contacted with particulate coal to adsorb residual organic contaminants including ABS and COD.

---

The invention herein described and claimed may be manufactured and used by or for the Government of the United States of America for governmental purposes without the payment of royalties thereon or therefor.

The invention relates to the purification of waste waters such as sewage.

Water pollution of streams, rivers and lakes by dissolved organic compounds in waste waters such as sewage is becoming an increasingly acute problem as population grows and industry expands. Present processing systems involve passing raw sewage first through a primary treatment unit and then through a secondary treatment unit, or passing the sewage only through a primary treatment unit. Conventional primary treatment consists of removing most of the suspended matter and some of the soluble organic compounds by screening and settling. Conventional secondary treatment consists of passing primary treatment effluent through digestive units such as trickling filter beds or activated sludge beds to remove more of the soluble organic compounds by e.g., bioprecipitation and adsorption. However, even present secondary treatment units do not remove all of the soluble organic compounds, and these residual contaminants are retured to rivers and streams. As a result the quality of water resources has been lowered in many areas as evidenced by foaming, taste and odor problems, and increasing concern is rising over the possible long-term effects of those pollutants on human health.

These residual, complex, soluble, organic contaminants are generally referred to as COD or BOD (chemical or biochemical oxygen demand materials that consume oxygen from water), which COD (or BOD) may include an alkyl benzene sulfonate (ABS) synthetic detergent.

The object of this invention is to provide a supplemental, efficient, economical process for removing these residual dissolved organic compounds from waste waters that have been previously treated by conventional methods, and dipsosing of the thus removed compounds.

A further object is to provide an efficient, economical process for simultaneously removing residual dissolved organic compounds and residual suspended solid matter from waste waters that have previously been treated by conventional methods.

It has now been discovered that these residual contaminants may be removed from treated waste waters by contacting the pre-treated waters with coal or coal char. As used herein, the term "coal" includes coal char. The coal acts as an effective adsorbent for these contaminants. The thus removed contaminants can be readily disposed of by merely burning the coal containing the adsorbed contaminants. Since coal is also an efficient filter medium for suspended solid materials in the waste waters, it can be utilized to remove residual suspended materials along with residual dissolved contaminants.

Further objects and advantages of the invention will be had from the following description of the process:

Waste waters that have previously received primary treatment or primary and secondary treatment are brought into direct contact with the coal by any of the many well-known, conventional solid-liquid contacting expedients such as concurrent contact, countercurrent contact, and contact by intimate mixing and subsequent separation. countercurrent flow of coal and effluent through a vertical column, whereby the most contaminated water is contacted with spent coal and the least contaminated water is contacted with fresh coal, is very suitable for the process of the invention. The spent coal from such a process can be separated from treated water by conventional means.

Regular commercial coals such as sub-bituminous, low volatile bituminous, medium volatile bituminous, high volatile bituminous, and coal char are effective for the purposes of this invention.

The coal may be pulverized to increase the adsorbent surface contact area thereof. Since pulverization generally increases the adsorptive capacity of the coal, the coal is preferably comminuted. Particle sizes between ¼ inch and 325 mesh show the most efficiency.

Process variables such as operating temperatures and pressures, contact time and the amount of coal required per unit volume of waste water depend upon (1) the grade of coal utilized, (2) the particle size of the coal, (3) the particular waste waters being treated and (4) the particular contact expedient being employed. Room temperature and atmospheric pressure are adequate for the purposes of the invention. However, special applications may require elevated or depressed conditions. Although a contact time of 24 hours was used in batch runs, tests indicated that greater adsorption occurs during the first moments of contact so that the conventional waste water treatment contact times of 4–8 hours would be adequate. In regard to the amount of coal required per unit volume of waste waters, tests showed that no direct relationship exists between effectiveness of contaminant removal and adsorbent concentration. The coal-mass-to-water-volume ratio may range from ½ to 10 grams of coal per liter of waste water for batch operations. Continuous operations require less coal, and as little as .05 gram of coal per liter of waste water may be utilized.

The following table indicates the effectiveness of various types and grades of coals, as well as flyash. The tests were conducted at 22° C. and atmospheric pressure. The waste water was conventionally treated final effluent from secondary sewage treatment plants. The sewage was filtered to remove solid particles. The coals used were ground to either 42–60 mesh or 200–250 mesh. Weighed amounts of the coal were added to three liters of sewage and the mixture stirred for 24 hours. A control sample of sewage without coal therein was also stirred for 24 hours. Types of coal, concentrations and results are given in the table.

TABLE.—TESTS OF ADSORBENTS STIRRED WITH SECONDARY SEWAGE EFFLUENT AT 22° C. FOR 24 HOURS

| | Lvb coal [1] 42- to 60-mesh | | Hvbb coal [2] 200- to 250-mesh | | Hvcb coal [3] 200- to 250-mesh | | Sub-B-coal [4] 42- to 60-mesh | | Fly ash unsieved (6.0% C) | | Lvb coal [5] char 42- to 60-mesh | |
|---|---|---|---|---|---|---|---|---|---|---|---|---|
| | COD | ABS | COD | ABS | COD | ABS | COD | ABS | COD | ABS | COD | ABS |
| Initial concentration, p.p.m. | 56 | 5.7 | 49 | 5.5 | 73 | 8.9 | 71 | 5.9 | 36 | 2.6 | 59 | 7.1 |
| Percent removal in 24 hr. at following adsorbent concentrations, g./liter: | | | | | | | | | | | | |
| 0.5 | 0 | 2 | 4 | 0 | 14 | 13 | 4 | 0 | 19 | −12 | 10 | 0 |
| 1.0 | 13 | 0 | 6 | 2 | 52 | 78 | 11 | 3 | 22 | 4 | 3 | 0 |
| 2.0 | 30 | −2 | 33 | 47 | 62 | 90 | 46 | 64 | 25 | 31 | 28 | 18 |
| 4.0 | 32 | 2 | 39 | 45 | 34 | 64 | 13 | 12 | 39 | 61 | 15 | 6 |
| 8.0 | 32 | 9 | 27 | 25 | 41 | 64 | 32 | 59 | 56 | 77 | 37 | 41 |

[1] Low volatile bituminous.
[2] High volatile B bituminous.
[3] High volatile C bituminous.
[4] Sub-bituminous B.
[5] Prepared by heating lvb coal in 3% $O_2$ and steam at 475° C. at atm. press. for 6 hrs.

Anthracite and lignite were also tested and showed some adsorption affinity for COD and ABS. However, the adsorption capacity of these coals was insufficient for effective effluent treatment.

If the final effluent from conventional treating plants still contains suspended matter, the coal may be utilized to perform the dual function of simultaneously adsorbing residual soluble organic compounds and filtering this residual suspended matter. This is accomplished by maintaining the coal in compact form or as a stationary bed. When the coal is used in this manner, residual soluble phosphates present in the effluent are also filtered out. While the reason for this is obscure at present, the removal of phosphates during filtration may be due to the formation of some form of linkage between the compounds containing phosphate groups and the solid particles.

Spent coal, after separation from treated liquid, is dried sufficiently and then burned, with little or no loss of heating value, to readily dispose of adsorbed compounds. The burning operation can be utilized to produce electrical or other energy, in which case the process may be located near a powerplant or other coal burning facility. The burning operation produces a flyash which likewise possesses adsorbing qualities as shown in the table and can also be used in the waste treatment process.

The cost of naturally occurring coal is but a fraction of the cost of materials such as activated carbon which have been used on effluents from waste treatment operations. The essential, time-consuming and expensive processes associated with the regeneration of spent forms of materials such as activated carbon are completely eliminated by using coal. As stated previously, utilization of coal permits easy ultimate disposal of the undesirable contaminants.

The process of the present invention creates a new market for coal and at the same time economically produces cleaner waste waters which result in cleaner streams and rivers. These in turn contribute to better health, improved recreation facilities and less costly water for industrial and domestic use.

While the particular process herein described is well adapted to carry out the objects of the present invention, it is to be understood that various modifications and changes may be made all coming within the scope of the following claims.

What is claimed is:

1. A method for removing ABS and COD contaminants from an effluent containing said contaminants, said effluent being directly obtained from a sewage water treatment plant and selected from the group consisting of a primary sewage water treatment plant and a secondary sewage water treatment plant, comprising contacting said effluent with a particulate coal to adsorb said ABS and COD contaminants, said coal being selected from the group consisting of sub-bituminous, low volatile bituminous, medium volatile bituminous, high volatile bituminous and coal char; and separating said coal from treated effluent.

2. The method of claim 1 wherein the particle size of the coal is within the range of ¼ inch to 325 mesh.

3. The method of claim 1 wherein said separated coal is burned to dispose of said adsorbed contaminants and produce flyash.

4. The method of claim 3 wherein said flyash is contacted with effluent obtained from said sewage water treatment plant, whereby residual organic contaminants contained in the effluent are adsorbed thereon.

5. The method of claim 1 wherein the coal is disposed in the form of a bed and the effluent is passed therethrough, whereby any suspended solid matter present in the effluent is removed by filtration.

References Cited

UNITED STATES PATENTS

| 1,933,567 | 11/1933 | Rodman | 210—63 X |
| 2,029,962 | 2/1936 | Urbain et al. | 210—40 X |
| 2,254,745 | 9/1941 | Jannek | 210—40 |
| 2,887,451 | 5/1959 | Hill et al. | 210—40 |
| 3,152,985 | 10/1964 | Stoertz et al. | 210—40 |
| 3,171,802 | 3/1965 | Rice et al. | 210—52 |
| 3,218,253 | 11/1965 | Clarke et al. | 210—40 X |
| 3,244,621 | 4/1966 | Bouthilet | 210—39 X |
| 3,300,403 | 1/1967 | Kehoe | 210—40 X |
| 3,279,603 | 10/1966 | Busse | 210—193 X |
| 3,373,085 | 3/1968 | Masciantonio | 210—39 X |

OTHER REFERENCES 256,316  8/1926  Great Britain.

FOREIGN PATENTS

Use of Activated Carbons and Chemical Regenerants in Treatment of Waste Water: AWTR–11; Public Health Service Publication No. 999–W–13; May 1964, pp. 1–9 and 32–34 relied on.

AWTR Summary Report: AWTR–14; Public Health Service Publication No. 999–W–24; April 1965; pp. 20–25 relied on.

REUBEN FRIEDMAN, *Primary Examiner.*

C. DITLOW, *Assistant Examiner.*

U.S. Cl. X.R.

210—67